United States Patent
Kumar et al.

(10) Patent No.: US 7,267,772 B2
(45) Date of Patent: Sep. 11, 2007

(54) BIOLOGICAL PROCESS FOR REDUCING CHEMICAL AND BIOCHEMICAL OXYGEN DEMAND OF PULP AND PAPER INDUSTRIAL EFFLUENT

(75) Inventors: Rita Kumar, Delhi (IN); Deepa K. Tiku, Delhi (IN); Poonam Sharma, Delhi (IN); Anil Kumar, Delhi (IN); Rekha Chaturvedi, Delhi (IN)

(73) Assignee: Council of Scientific and Industrial Research, New Delhi (IN)

( * ) Notice: Subject to any disclaimer, the term of this patent is extended or adjusted under 35 U.S.C. 154(b) by 228 days.

(21) Appl. No.: 11/024,027

(22) Filed: Dec. 28, 2004

(65) Prior Publication Data

US 2006/0138045 A1    Jun. 29, 2006

(51) Int. Cl.
C02F 3/34    (2006.01)

(52) U.S. Cl. .................. 210/601; 210/928; 435/252.4; 435/262.5

(58) Field of Classification Search ............... 210/601, 210/917, 928; 435/252.34, 252.5, 262, 262.5, 435/252.4
See application file for complete search history.

(56) References Cited

U.S. PATENT DOCUMENTS

| 4,266,035 A | 5/1981 | Blair et al. |
| 4,288,545 A * | 9/1981 | Spraker ...................... 435/42 |
| 4,880,740 A * | 11/1989 | Hoffmann et al. .......... 435/168 |
| 2004/0175407 A1* | 9/2004 | McDaniel ................... 424/423 |

FOREIGN PATENT DOCUMENTS

| GB | 2 386 124 | 9/2003 |
| WO | 2004/083410 | 9/2004 |

* cited by examiner

*Primary Examiner*—Fred G. Prince
(74) *Attorney, Agent, or Firm*—Ladas and Parry LLP

(57) ABSTRACT

The invention provides a biological process for reduction of chemical and biological oxygen demand of pulp and paper industrial effluent using a mixed bacterial consortium comprising of bacterial strains isolated from natural sources which is capable of reducing chemical and biological oxygen demand of pulp and paper industrial effluent to standard discharge limits.

31 Claims, 1 Drawing Sheet

Reduction of COD of mixed inlet ETP effluent of Century paper mill with different individual as well as a formulated bacterial consortium

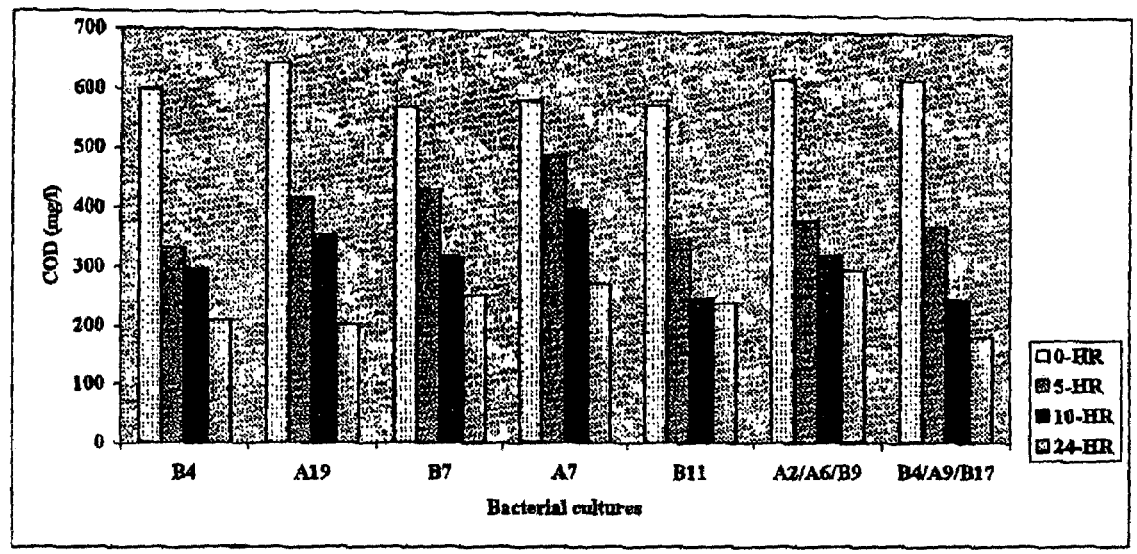
Fig 1: Reduction of COD of mixed inlet ETP effluent of Century paper mill with different individual as well as a formulated bacterial consortium
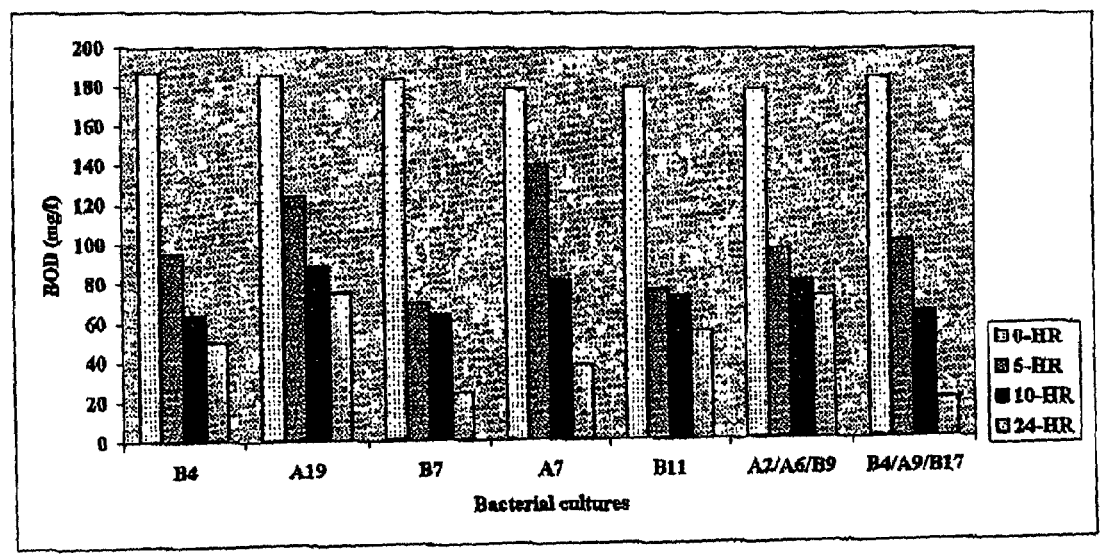
Fig 2.: Reduction of BOD of mixed inlet ETP effluent of Century paper mill with different individual as well as a formulated bacterial consortium

BIOLOGICAL PROCESS FOR REDUCING CHEMICAL AND BIOCHEMICAL OXYGEN DEMAND OF PULP AND PAPER INDUSTRIAL EFFLUENT

FIELD OF THE INVENTION

The present invention relates to a biological process for reduction of chemical and biological oxygen demand, hearer referred to as COD and BOD, respectively; of pulp and paper mill effluent using aerobic bacterial strains isolated from specific sources from the selected pulp and paper mill sites.

BACKGROUND AND PRIOR ART

The wastewater from an industry may be organic or inorganic in nature or a combination of both. In most cases, it contains toxic ingredients. The direct effect of wastewater pollution is to deplete, through the excessive organic load, the dissolved oxygen (D.O.) content of receiving waters to the point that the stream becomes incapable of exercising the self-purification processes. The deoxygenation may be high enough to destroy practically all fish and other aquatic life. Such polluted water may also cause sporadic outbreaks of water-borne diseases (Nandan and Raisuddin, 1996). The problem is compounded by the fact that solubility of oxygen in water is very low, less than 12 mg/l. This oxygen comes from two sources, viz. diffusion from the atmosphere at the air/water interface and as a by-product of photosynthesis. Photosynthetic organisms, such as plants and algae, produce oxygen when there is a sufficient light source. During times of insufficient light, these same organisms consume oxygen, resulting in the depletion of DO levels.

Biochemical Oxygen Demand (BOD) and Chemical Oxygen Demand (COD) are indices of the biologically degradable and chemically oxidizable fractions of the wastewater, respectively. These parameters are frequently used to define influent and effluent characteristics as also ensure the wastewater treatment efficiency. These are monitored regularly to give clearance to the discharge of the above wastewaters. Recalcitrant organic matter (ROM), which is presumed by some to be partly responsible for long-term sub-lethal toxicity in receiving waters (Labunska et al, 2001); is sometimes represented in terms of a lumped parameter, the COD. COD of the treated effluent is representative of the effectiveness of a treatment technique in its ability to remove the total organic material present in the influent.

BOD is the most widely used measure of the biodegradable organic content (Chee et al, 2000) and is usually expressed as the 5-day BOD at 20° C. ($BOD_5$) (APHA, 1998). The determination involves the measurement of dissolved oxygen during the biochemical oxidation of organic mater by the microorganisms at a standard duration and temperature. Microbes oxidize organic matter to provide themselves with sufficient energy to enable them to synthesize the complex molecules such as proteins and polysaccharides, which are needed to build new cells (Sessa, 1979).

Pulp and paper industry is one of the most important point sources for BOD elevation in the receiving waters; more so because most pulp mills are situated near rivers. The treated effluent is representative of the effectiveness of a treatment technique in its ability to remove the total organic material present in the influent. The contributors to COD in biotreated effluents are not only the non-biodegradable recalcitrant organic matter, but also a certain amount of degradable organic matter, which has resisted biodegradation due to its existence in a state where it was not bioavailable (Konduru et al, 2001).

A recent internal survey within the pulp and paper industry has reported that the COD values of the wastewaters can be as high as 11000 mg/l (Thompson and Forster, 2003). Typical loadings of BOD, COD and solids in the pulp mill effluents depend significantly on:
- nature and cleanliness of the stock
- whether the pulp and paper mill is equipped with a chemical recovery facility
- the bleaching sequences applied and
- the efficiency of the chemical recovery plant, as much as 96% of the COD load can be removed from the pulp cooking liquor.

The pollution load in terms of biological oxygen demand (BOD) from small paper mills is 2-5 times the pollution load from large paper mills equipped with soda recovery. Mills producing paperboard generate relatively lower volumes of wastewater (68-90 l/kg of product) with high BOD (72-82 kg/ton of product) and suspended solids (224-290 kg/ton) as compared to paper mills. Table 1 shows the mean range of concentrations of BOD, COD and SS normally measure in untreated pulp and paper mills.

TABLE 1

Mean/Range of concentrations (mg/l) of BOD, COD and Suspended Solids normally measured in untreated pulp and paper mills.

| Mill Source | BOD | COD | SS |
| --- | --- | --- | --- |
| Integrated pulp and paper mills | 160 | 550 | 230 |
| Paper mills | 160–1150 | 310–11000 | 15–3230 |

Source: Murtedza Mohammed, 1995

Biological treatment gives the ideal solution to treatment of wastewaters as less sludge is produced as compared to chemical treatments. Lower daily running costs are also incurred. Conventional treatment technologies essentially involve aerobic biological treatment methods.

Researchers across the globe have tried to devise innovative methods for achieving maximum reduction in the BOD and COD loadings of pulp and paper mill wastes.

Although numerous studies have looked at ways to degrade or remove COD and BOD of the pulp and paper effluents, the problem remains (Arcand and Archibald, 1993). COD removal of up to 80% by *Leptothrix ochracea, Pseudomonas multistreata* and *Flavobacterium ochracea*, isolated from activated sludge (Srivastava et al, 1995) has been reported. Tarlan et al, 2002, reported the use of algae for removal of COD in the range of 55-60%, however, only after a period of 20 days of retention.

Belsare and Prasad, 1988 reported that the effluent from bagasse based pulp and paper mills, when treated with the white rot fungus, *S. commune*, was able to reduce the BOD and COD of the effluent. However, an additional C-source like sucrose was required for the same with a 2-day incubation period and a pH of 4-5. Many other workers have also reported the use of white rot fungi for reduction of BOD and COD load of such wastewaters, in addition to decolorization (Kirk et al, 1976; Eaton et al, 1980; Prasad and Joyce, 1991; Nagarathanamma et al, 1999).

Sharma and Bandopadyaya, 1991, reported that lignin is not easily biodegradable and hence counts for high COD/BOD ratio. They used an anaerobic filter for the treatment of pulp and paper mill waste and achieve a maximum COD removal of 84.38% for an influent concentration of 4182.5 mg/l. Anaerobic processes are often prescribed as the first pretreatment step for pulp and paper mill wastewaters with increased COD concentrations, in order to meet the corresponding effluent requirements (Babuna et al, 1998). According to them, the magnitude of inert fractions in treatment of effluents is more important than the kinetics of the biodegradable part of the influent COD. They described an anaerobic application basis of a newly developed method that identifies separately the soluble and particulate initial inert and residual products. It was concluded that with the mentioned wastewater sample, having a total COD of 13000 mg/l, it is not possible to achieve a lower COD value than 2230 mg/l, which is the sum of the initially inert soluble COD and the soluble residual microbial products under anaerobic conditions. Grover et al, 1999, reported the use of an anaerobic baffled reactor (ABR) and effect of different pH, temperatures, hydraulic retention times and organs loading rates on continuous anaerobic digestion of black liquor from pulp and paper mills. A maximum COD reduction of about 60% at an organic loading rate of 5 kg $m^{-3}d^{-1}$ at a hydraulic retention time of 2 days was recorded.

Ali and Sreekrishnan 2000, reported reduction of COD and AOX of black liquor and bleach plant effluent from an agroresidue based pulp and paper mill by anaerobic treatment. Addition of 1% w/v glucose however was a necessity as in its absence only about 31% of COD reduction could be achieved. Wagner and Nicell, 2001, reported the treatment of a foul condensate from kraft pulping with Horse Radish Peroxidase and hydrogen peroxide. Although, a total phenol reduction occurred, the overall COD removal was marginal.

Modifications in the bleaching sequence can lead to reducing the pollutant loading to levels lower than those normally found in the effluents of mills using the conventional bleaching sequence, CEHDED. E.g., when the chlorine delignification stage is preceded by oxygen treatment, the resulting color, BOD and COD levels were found to be 87%, 77% and 76% less than the levels recorded for CEDED (Muhammed, 1995). Certain studies seem to indicate that the residual color in pulp mill effluents may be linked with the recalcitrant COD. Kemeny and Banerjee, 1997 observed a correlation between the end-of-pipe COD and color, thereby suggesting that the residual color might be related to the organic component that is not removed during treatment.

Till date, the are almost no reports regarding the utilization of pure bacterial cultures for bringing down the COD and BOD of pulping effluent. The novelty of the present invention is the application of pure cultures of bacteria in the form of a specifically designed synergistic mixture; isolated from natural habitat, for removing COD and BOD of the pulp and paper wastewaters in an industrially and economically viable fashion.

OBJECT OF THE INVENTION

The main object of the present invention is to provide a process for the aerobic treatment of pulp mill wastewater in terms of reduction of COD and BOD. Another object of the present invention is to provide a bacterial consortium isolated from two different sources from the vicinity of a pulp and paper mill.

SUMMARY OF THE INVENTION

The present invention provides a process for the reduction of COD and BOD from a pulp mill effluent using aerobic treatment process. A bacterial consortium comprising of aerobic bacterial strains isolated from specific sources from the pulp and paper mill was used for reduction of COD and BOD of the pulp mill effluent.

The present invention therefore provides a synergistic bacterial consortium for treatment of pulp and paper industrial wastewater, the consortium comprising three bacterial strains *Pseudomonas aeruginosa* (DSMZ 03504), *Bacillus megaterium* (MTCC 6544) and *Stenotrophomonas maltophilia* (CC 5182).

In one embodiment of the invention, each strain is present in an amount of 20 to 40% by wt.

In another embodiment of the invention, all strains are present in equal proportions In another embodiment of the invention, the bacterial mains are isolated from activated sludge and soil samples collected from vicinity of pulp and paper mills located in India.

In another embodiment of the invention, *Pseudomonas aeruginosa* (DSMZ 03504) has the following characteristics: Gram-Negative, Shape-rods.

In another embodiment of the invention, *Bacillus megaterium* (MTCC 6544) has the follow characteristics: Gram-Positive, Shape-rods, In another embodiment of the invention, *Stenotrophomonas maltophilia* (MTCC 5182) has the following characteristics: Gram-Negative, Shape-rods.

In another embodiment of the invention, the consortium exhibits 67 to 71% COD removal and 87 to 89% BOD removal.

The present invention also relates to a process for preparing a bacterial consortium for the treatment of pulp and paper industrial wastewater, the consortium comprising three bacterial strains, *Pseudomonas aeruginosa* (DSMZ 03504), *Bacillus megaterium* (MTCC 6544) and *Stenotrophomonas maltophilia* (MTCC 5182), the process comprising inoculating individual bacterial isolates separately in nutrient broth, incubating the inoculates, mixing the individual cultures after colony formation, centrifuging the resultant cell suspension to form a cell pellet, washing the cell pellet and re-centrifuging to obtain a final cell pellet, and suspending the final cell pellet in phosphate buffer.

In one embodiment of the invention, the nutrient broth contains per liter, 5.0 g of peptic digest of animal tissue; 5.0 g of sodium chloride, 1.5 g of beef exact; 1.5 g of yeast extract and 0.1 ml of Tween 80.

In another embodiment of the invention, incubation of the cell cultures is effected at a temperature in the range of 32-37° C. and for approximately 12-18 hours, under gentle shaking at a rpm in the range of 100-120.

In another embodiment of the invention, the colony formation is determined by measuring the optical density of all cultures 650 nm at appropriate time intervals till colony formation unit CFU/ml reaches about $10^9$ to form a cell suspension.

In another embodiment of the invention, the cell suspension is centrifuged at an appropriate rpm for a period in the range of 15 to 20 minutes at a temperature ranging between 4-10° C. and then washed by dissolving in minimal amount of 50 mM phosphate buffer having a pH of 6.8.

In a further embodiment of the invention the cell pellet is recentrifuged at the same conditions as for the first centrifugation.

In a further embodiment of the invention the final pellet is suspended in 50 mM phosphate having a pH 6.8 to form the consortium.

In another embodiment of the invention, the bacteria are isolated from sources in the vicinity of pulp and paper wastewater and include old activated sludge from plant ETP and soil samples.

In another embodiment of the invention, each strain is present in an amount of 20 to 40% by wt.

In another embodiment of the invention, all strains are present in equal proportions.

In another embodiment of the invention, *Pseudomonas aeruginosa* (DSMZ 03504) has the following characteristics: Gram-Negative, Shape-rods.

In another embodiment of the invention, *Bacillus megaterium* (MTCC 6544) has the following characteristics: Gram-Positive, Shape-rods.

In another embodiment of the invention, *Stenotrophomonas maltophilia* (MTCC 5182) has the follow characteristics: Gram-Negative, Shape-rods.

In another embodiment of the invention, the consortium exhibits 67 to 71% COD removal and 87 to 89% BOD removal.

The present invention also relates to a process for the treatment of pulp and paper industrial wastewater using at bacterial consortium comprising three bacterial strains, *Pseudomonas aeruginosa* (DSMZ 03504), *Bacillus megaterium* (MTCC 6544) and *Stenotrophomonas maltophilia* (MTCC 5182), the process comprising inoculating pulp and paper industrial wastewater with the bacterial consortium, incubating the bacterial consortium in the wastewater and measuring the COD and BOD demand of the wastewater.

In one embodiment of the invention, the consortium exhibits 67 to 71% COD removal and 87 to 89% BOD removal.

BRIEF DESCRIPTION OF THE DRAWINGS

FIG. 1 is a bar graph showing the reduction of chemical oxygen demand (COD) of mixed inlet effluent treatment plant (ETP) effluent of a Century paper mill with different individual bacteria and with bacteria consortia;

FIG. 2 is a bar graph showing the reduction of biochemical oxygen demand (BOD) of mixed inlet effluent treatment plant (ETP) effluent of a Century paper mill with different individual bacteria and with bacterial consortia.

DETAILED DESCRIPTION OF THE INVENTION

The specific bacterial consortium in the said invention is a specially formulated combination of the following bacteria:

| S.No. | Culture | Accession No. |
|---|---|---|
| 1. | *Pseudomonas aeruginosa* | DSMZ 03504 |
| 2. | *Bacillus megaterium* | MTCC 6544 |
| 3. | *Stenotrophomonas maltophilia* | MTCC 5182 |

The main characteristic features of the above bacterial strains are given below:

*Pseudomonas aeruginosa* (DSMZ 03504)

This bacterium *Pseudomonas aeruginosa* (DSMZ 03504) is aerobic in nature, gram negative, motile, motile, shows optimum growth at 35° C., capable of utilizing the Glucose, Gluconate, Adipate, Malate, Mannitol and Citrate as carbon source.

*Bacillus megaterium* (MTCC 6544)

This bacterium, *Bacillus megaterium* (MTCC 6544) is a facultative aerobic, motile, is gram positive, is capable of growth at 15° C.-55° C., is capable of growth at pH 5-pH 11, is capable of hydrolyzing starch and casein, is catalase positive and produces acids from cellobiose, dextrose, fructose, galactose, inositol, salicin and sorbitol.

*Stenotrophomonas maltophilia* (MTCC 5182)

This bacterium, *Stenotrophomonas maltophilia* (MTCC 5182) is facultative aerobic, is gram negative, is oxidase and catalase positive, shows positive growth in presence of aspergillin and leucine, The bacterial consortium comprising of the above strains facilitates reduction of COD and BOD load of pulp and paper effluent, lowering these levels to the standard discharge limits set by regulatory authorities. The above-mentioned bacterial strains are deposited at the IMTECH and DSMZ, as stated above and will be made available to the public on request as per standard official procedures.

The formulated bacterial consortium may contain the bacteria in a preferred embodiment of the invention, in uniform amounts. The microbial consortium of the present invention is useful for biodegradation of pulp and paper wastewaters in terms of reducing the overall COD and BOD load of such wastewaters.

The bacterium described in the invention is isolated from selected source habitats. The source habitats include old activated sludge from effluent treatment plant of a pulp and paper mill and soil samples collected from in and around the vicinity of the said mill.

In the present invention, the specifically formulated bacterial consortium is prepared by inoculating individual bacterial isolates described above, separately in nutrient broth containing (per liter), 5.0 g of peptic digest of animal tissue; 5.0 g of sodium chloride, 1.5 g of beef extract; 1.5 g of yeast extract and 0.1 ml of Tween 80. The said cultures are preferably incubated at a temperature of 32-37° C. for approximately 12-18 hours, under gentle shaking. Optical density of all the cultures is measured at 650 nm after stipulated time intervals. After attaining the required growth in terms of O.D. and a corresponding CFU/ml (colony forming units/ml ) of about $10^9$, the individual cultures are mixed in desired proportions for formulating the consortium. The resultant cell suspension is centrifuged at an appropriate rpm for a period of 20 minutes at a temperature ranging between 4-10° C. The obtained cell pellet washed twice by dissolving in minimum quantity of 50 mM phosphate buffer (pH 6.8) and recentrifugation at the above mentioned conditions. The final cell pellet thus obtained is suspended in desired volume of phosphate buffer and stored at a temperature, preferably 4° C., till used.

The formulated microbial consortium prepared in the above said manner can be used as inoculum for treating the pulp and paper industrial wastewater, specifically for the reduction of COD and BOD analysis was performed as per the methods described in the Standard Methods for the Examination of Water and Wastewater (APHA, 1998).

Accordingly the microbial consortium comprises a mixture of at least the following isolated bacterial strains present in equal proportions useful for reducing the oxygen demand (both chemical and biochemical) of the pulp and paper effluent.

The process for the preparation of the microbial consortium comprises:
a) isolating a range of bacterial isolates from activated sludge and soil samples collected from the vicinity of a selected pulp and paper milt according to know methods;
b) culturing the isolates on different media to obtain pure cultures
c) inoculating the isolated bacteria individually in nutrient medium (Ingredients: peptic digest of animal tissue—5 g/l ; Sodium Chloride—5 g/l ; Beef extract—1.5 g/l and Yeast extract—1.5 g/l) and incubating them at an ambient temperature under gentle shaking for a period of 12-18 hours;
d) observing the optical density of the grown cultures at 650 nm;
e) harvesting the cells obtained in step (d) by centrifuging for 15-20 minutes at a temperature preferably at 4° C.;
f) washing the cell pellet obtained in step (e) by dissolving in 50 mM phosphate (pH 6.8-7.2), followed by recentrifugation;
g) repeating step (f) for giving a second washing to the obtained cells;
h) dissolving the pellet obtained from step (g) in desired volume of 50 mM phosphate (pH 6.8), to obtain the desired bacterial consortium for reducing the COD and BOD load of pulp and paper wastewater;
i) testing the individual pure cultures of the isolated bacterial strum as obtained in step (h) for their biodegradative capability in reducing the COD and BOD load of pulp and paper wastewaters (COD and BOD was estimated according to *Standard Methods for the Examination of Water and Wastewater*, 20$^{th}$ edn. 5-1-5-6. Baltimore);
j) selecting the bacterial strains with the maximum capacity to reduce the COD and BOD load of the pulp and paper mill wastewaters;
k) mixing the bacterial strains selected in step (j) in various combinations to obtain different microbial consortia;
l) obtaining the cell pellets of each microbial consortium in the manner as described in steps (c), (d), (e), (f), (g) and (h);
m) testing the consortia as obtained in step (l) for treating the pulp and paper wastewaters for reduction of COD and BOD load (COD and BOD was estimated according to *Standard Methods for the Examination of Water and Wastewater*, 20$^{th}$ edn. 5-1-5-6. Baltimore);
n) selecting the best consortia from the results in step (m).

The bacterial consortium comprises of a synergistic mixture of the following bacterial strains, viz. *Pseudomonas aeruginosa* (DSMZ 03504), *Bacillus megaterium* (MTCC 6544) and *Stenotrophomonas maltophilia* (MTCC 5182). The bacterial strains were isolated from the source habitat, which are the old activated sludge and soils from selected pulp and paper industry. The isolated bacteria were cultured on nutrient medium (Ingredients: peptic digest of animal tissue—5 g/l; Sodium Chloride—5 g/l; Beef extract—1.5 g/l and Yeast extract—1.5 g/l) to obtain pure cultures. The individual bacteria isolated were inoculated separately in nutrient medium, followed by incubation at 30-37° C. for 12-18 hours at 100-120 rpm. The OD of the grown bacterial strains is observed at 650 nm. The obtained cell suspension having desired optical density is centrifuged at an appropriate rpm, preferably at 6000 rpm, for 15-20 minutes to form a pellet. The pellet is washed and then dissolved in desired volume of 50 mM phosphate (pH 6.8), to obtain the desired bacterial consortium for reducing the COD and BOD load of pulp and paper wastewater.

The individual pure cultures of the isolated bacterial strains were tested for reducing the COD and BOD load of pulp and paper wastewater. Only bacterial strains with maximum capacity to reduce COD and BOD load of the pulp and paper mill wastewater, were selected. The selected bacterial strains were mixed in various combinations to obtain different microbial consortia and cell pellets of each microbial consortium were obtaining in the manner described above. The obtained consortia were tested for treating the pulp and paper wastewaters for reduction of COD and BOD load and the optimal was selected from the obtained results.

The invention ether described with references to the following illustrative examples and shall not be construed to limit the scope of the invention.

EXAMPLE 1

Old activated sludge obtained from the Effluent Treatment Plant (ETP) of a selected pulp and paper mill (Century pulp and paper mill, Lal Kuan, Uttaranchal), was selected for the isolation of bacteria, 5.0 grams of homogenized activated sludge taken from effluent treatment plant of pulp and paper mill is inoculated in the enrichment medium. The enrichment medium consists of 100 ml of sludge infusion, 25 ml of sterile nutrient broth and 0.1% (w/v) each of lignin (Alkali lignin-Aldrich, USA), vanillin and tannin (Sigma). The pH is adjusted to 6.8±0.2. Sludge extract is prepared by boiling a mixture containing 300 ml of sludge in 1200 ml of triple distilled water for about 30 minutes. The infusion was cooled, centrifuged and coarse filtered, The final filtrate obtained is autoclaved at 121° C., 15 psi for 20 minutes and used for preparing the enrichment medium. Enrichment medium inoculated with activated sludge is incubated at 37° C. for 24-48 hours to obtain an enriched culture.

Different media were chosen for the isolation, which are listed below;
i) Sludge infusion+2% agar
ii) Sludge infusion+0.2% each of alkali lignin (Sigma Aldrich), tannin and vanillin+2% agar
iii) Sludge infusion+nutrient broth in a ratio 1:1)+2% agar
iv) Effluent+2% agar
v) Nutrient broth+0.2% each of lignin, tannin and vanillin+2% agar
vi) Nutrient agar (Ingredients: peptic digest of animal tissue—5 g/l; Sodium Chloride—5 g/l; Beef extract—1.5 g/l ;Yeast extract—1.5 g/l and 20 g/l agar)
vii) Sludge infusion+inorganic nutrients Per Liter Composition:

| | |
|---|---|
| Sludge infusion | 400 ml |
| $KH_2PO_4$ | 7.5 g |
| $MgSO_4.7H_2O$ | 0.5 g |
| Agar | 20 g |
| Glucose | 3.0 g |
| Triple distilled Water | 600 ml |

Enriched culture is serially diluted to $10^{-12}$ using 0.05M $NaH_2PO_4$—$Na_2HPO_4$ buffer, pH 6.8. Serially diluted inoculum is then plated and incubated at 37° C. for 24-48 hours. Single isolated colony is picked and streaked on a fresh plate in the same medium. The above step is repeated twice, till pure colonies are obtained. Total 20 bacterial isolates were isolated for further experimentation. (Table 1.1)

TABLE 1.1

Bacterial isolates from old activated sludge obtained from Effluent Treatment Plant (ETP)

| Sl.No. | Bacterial Isolates |
|---|---|
| 1. | Isolate A1 |
| 2. | Isolate A2 |
| 3. | Isolate A3 |
| 4. | Isolate A4 |
| 5. | Isolate A5 |
| 6. | Isolate A6 |
| 7. | Isolate A7 |
| 8. | Isolate A8 |
| 9. | Isolate A9 |
| 10. | Isolate A10 |
| 11. | Isolate A11 |
| 12. | Isolate A12 |
| 13. | Isolate A13 |
| 14. | Isolate A14 |
| 15. | Isolate A15 |
| 16. | Isolate A16 |
| 17. | Isolate A17 |
| 18. | Isolate A18 |
| 19. | Isolate A19 |
| 20. | Isolate A20 |

EXAMPLE 2

Soil samples from the vicinity of a selected pulp and paper mill (Century pulp and paper mill, Lal Kuan, Uttaranchal), was selected for the isolation of autochthonous bacterial population. Different media were chosen for the isolation as listed below;

i) Soil extract+2% agar ii) Soil extract+0.2% alkali lignin (Sigma Aldrich)

iii) Soil extract+nutrient broth in a ratio 1:1)+2% agar iv) Soil extract+0.2% xylan+2% agar 5.0 g of fresh soil from the above, said site was inoculated in the enrichment medium. Enrichment medium was prepared by adding 75 ml of soil extract to 150 ml of Nutrient Broth (Ingredients: peptic digest of animal tissue—5 g/l ; Sodium Chloride—5 g/l; Beef extract—1.5 g/l and Yeast extract—1.5 g/l). To this 5 ml each of 0.1% (v/v) of lignin and cellulose were added along with 100 µl of Candid B, autoclaved at 15 lbs for 20 minutes at 121° C. The above medium was kept at 120 rpm for 48 hours at 30° C.

Soil Extract was prepared from the soil collected from the above site. 1 kg of the soil was dried at 50° C. for 2 hrs. 400 gm of the dried soil was autoclaved with 960 ml single distilled water for 1 hr at 15 lbs. After autoclaving, the sample was centrifuged at 5000 rpm for 10 minutes at 5° C. The supernatant (extract) was collected and stored in sterile containers for preparation of medium for isolation. The enriched soil samples are serially diluted in $Na_2HPO_4$—$NaH_2PO_4$ buffer (pH 6.8, 0.05 M). 100 µl from each respective dilution was spread plated in duplicates on media plates. The plates thus obtained were incubated at 30±2° C. for 16-24 hrs in an inverted position. The singe isolated colonies were picked and streaked on fresh plates containing the same medium, The above step was repeated till pure colonies are obtained. Total 18 bacterial isolates were isolated for further experimentation. (Table 2.1)

TABLE 2.1

Bacterial isolates from soil from the vicinity of a pulp and paper mill (Century pulp and paper mill, Lal Kuan, Uttaranchal, India)

| Sl.No. | Bacterial Isolates |
|---|---|
| 1. | Isolate B1 |
| 2. | Isolate B2 |
| 3. | Isolate B3 |
| 4. | Isolate B4 |
| 5. | Isolate B5 |
| 6. | Isolate B6 |
| 7. | Isolate B7 |
| 8. | Isolate B8 |
| 9. | Isolate B9 |
| 10. | Isolate B10 |
| 11. | Isolate B11 |
| 12. | Isolate B12 |
| 13. | Isolate B13 |
| 14. | Isolate B14 |
| 15. | Isolate B15 |
| 16. | Isolate B16 |
| 17. | Isolate B17 |
| 18. | Isolate B18 |

EXAMPLE 3

For preliminary studies, three consortia were formulated comprising of three bacteria each and screened for COD and BOD reduction of the pulp and paper mill wastewater.

The treatabilty experiment was set up in batch cultures in conical shake flasks at 37° C. at 120 rpm for a period of five days. 100 ml sterile NB was inoculated with 100 µl of respective mother cultures and incubated at 37° C./120 rpm for 16-18 hours. The initial and final optical densities at 650 nm were noted. Cultures were harvested at an $OD_{650}$ of 1.0 by centrifuging at 6000 rpm for 20 minutes at 4° C. The pellet obtained was washed twice, using sterile phosphate buffer (pH 6.8 0.05 M) and resuspended in small volume of the same. This suspension was then used for treatability assay in a ratio of 1:1, i.e., 100 ml of effluent sample was treated with pellet obtained from 100 ml of culture media. Control flasks without any additional inoculum were also maintained and results compared with these samples. COD and BOD levels were analysed over a period of five days according to the standard procedure as mentioned in APHA APHA (Standard Methods for the Examination of Water and Wastewater, $20^{th}$ edn. 5-1-5-6. Baltimore). Increase in these levels was observed in all the test samples, on addition of biomass, as biomass itself exerted COD and BOD. The 0-day samples exhibited much higher initial COD and BOD values as compared to the control sample run in parallel. This resulted in erroneous results (Table 3.1). Hence in all the future experiments a modified analysis method was employed.

TABLE 3.1

Preliminary screening of 3 consortia formulated from different bacteria isolated from Century and Shiva paper mills wastewater for reduction of COD of Star Mill Inlet wastewater over a period of 5 days.

| Bacterial consortia | COD (mg/l) | |
|---|---|---|
| | 0 day | $5^{th}$ day |
| C1 | 1510 | 1195 |
| C2 | 1012 | 815 |
| C3 | 1274 | 998 |
| Control | 892 | 906 |

EXAMPLE 4

Biodegradation in Terms of BOD and COD of Pulp and Paper Industrial Waste Water using 12 Formulated Microbial Consortia Biodegradation experiments were set up in batch cultures in conical shake flakes at 37° C. at 120 rpm for a period of five days. 100 ml sterile NB was inoculated with 100 µl of respective mother cultures and incubated at 37° C./120 rpm for 16-18 hours. The initial and final optical densities at 650 nm were noted. Cultures were harvested at an $OD_{650}$ of 1.0 by centrifuging at 6000 rpm for 20 minutes at 4° C. The pellet obtained was washed twice, using sterile phosphate buffer (pH 6.8 0.05 M) and resuspended in small volume of the same. This suspension was then used for treatability assay in a ratio of 1:1, i.e., 100 ml of effluent sample was treated with pellet obtained from 100 ml of culture media. Control flasks without any additional inoculum were also maintained and results compared with these samples. COD and BOD levels were analysed over a period of five days according to the standard procedure as mentioned in APHA APHA (*Standard Methods for the Examination of Water and Wastewater*, 20$^{th}$ edn. 5-1-5-6. Baltimore). Increase in these levels was observed in all test samples, on addition of biomass, as biomass itself exerted COD and BOD. 0-day samples exhibited much higher initial COD and BOD values as compared to the control sample run in parallel. Tables 3.2a and 3.2b show biodegradative capability of 12 chosen consortia.

TABLE 3.2(a)

Screening of consortia formulated from isolated bacteria for reduction of COD of inlet waste water of Star Paper Mill (Located in Saharanpur, India) over a period of 5 days.

| Bacterial consortia | COD (mg/l) | % reduction |
|---|---|---|
| C1 | 198 | 67.0 |
| C2 | 136 | 77.3 |
| C3 | 115 | 80.8 |
| C4 | 154 | 74.3 |
| C5 | 314 | 47.7 |
| C6 | 372 | 38.0 |
| C7 | 300 | 50.0 |
| C8 | 370 | 38.3 |
| C9 | 228 | 62.0 |
| C10 | 272 | 54.7 |
| C11 | 280 | 53.3 |
| C12 | 274 | 54.3 |
| Control | 600 | |

TABLE 3.2(b)

Screening of consortia formulated from isolated bacteria for reduction of COD of inlet wastewater of Century Paper Mill (Located in Nainital, India) over a period of 5 days.

| Bacterial consortia | BOD (mg/l) | % reduction |
|---|---|---|
| C1 | 27 | 93.3 |
| C2 | 20 | 95.0 |
| C3 | 10 | 97.5 |
| C4 | 16 | 96.0 |
| C5 | 28 | 93.1 |
| C6 | 15 | 96.3 |
| C7 | 17 | 95.8 |
| C8 | 19 | 95.3 |
| C9 | 17 | 95.8 |
| C10 | 12 | 97.1 |
| C11 | 15 | 96.3 |

TABLE 3.2(b)-continued

Screening of consortia formulated from isolated bacteria for reduction of COD of inlet wastewater of Century Paper Mill (Located in Nainital, India) over a period of 5 days.

| Bacterial consortia | BOD (mg/l) | % reduction |
|---|---|---|
| C12 | 17 | 95.8 |
| Control | 403 | |

EXAMPLE 5

Six different bacterial consortia (each consortium containing 3 bacteria) were then formulated comprising of bacteria isolate from different sources and screened for their ability to reduce the COD and BOD of the Century inlet ETP samples. These consortia were able to bring the COD levels down to standard levels but only after a 3-day period. The results are depicted in Table 3.3 (a) and (b). Since, for any effective industrial treatment technology, time of retention is an important factor, efforts were made to improve the same.

TABLE 3.3(a)

Screening of 6 consortia formulated from different bacterial isolates for reduction of COD of Century Paper Mill Inlet wastewater over a period of 5 days.

| | COD (mg/l) | | |
|---|---|---|---|
| Bacterial consortia | 0 day | 3$^{rd}$ day | 5$^{th}$ day |
| Consortium 1 | 294 | 175 | 140 |
| Consortium 2 | 325 | 161 | 144 |
| Consortium 3 | 290 | 118 | 142 |
| Consortium 4 | 375 | 136 | 120 |
| Consortium 5 | 327 | 205 | 124 |
| Consortium 6 | 309 | 163 | 177 |
| Control | 337 | 310 | 295 |

TABLE 3.3(b)

Screening of 6 consortia formulated from different bacterial isolates for reduction of BOD of Century Paper Mill Inlet wastewater over a period of 5 days.

| | BOD (mg/l) | | |
|---|---|---|---|
| Bacterial consortia | 0 day | 3$^{rd}$ day | 5$^{th}$ day |
| Consortium 1 | 163 | 20 | 14 |
| Consortium 2 | 157 | 12 | 9 |
| Consortium 3 | 123 | 13 | 7 |
| Consortium 4 | 171 | 10 | 6 |
| Consortium 5 | 191 | 9 | 2 |
| Consortium 6 | 181 | 40 | 10 |
| Control | 216 | 10 | 29 |

EXAMPLE 6

Reduction in BOD and COD of the mixed inlet ETP samples from Century paper mill was assessed by treating them with freshly isolated isolates, both as individual as well as formulated in the form of mixed bacterial consortia. Samples inoculated with the above combinations of bacteria were incubated at 37° C. for a period of 24 hours at 120 rpm and sampled at different time intervals. The results are presented in FIGS. 1 and 2. As is evident from the results, isolates A7 and B7 were found to be reducing the BOD levels to the standard discharge limits within 24 hours. Isolate B17 could bring down the COD by 60% (from 620 mg/l to 247 mg/l), well within discharge limits, within 10 hours. Isolates B4, A19 AND B7 reduced COD values by 65.9%, 67.2% and 59.3%, respectively. The consortium formulated by combining the three bacterial isolates, B4, A9 and B17 exhibited better results as compared to their individual components, with the COD level of the sample going down to 180 mg/l and the BOD levels coming down to 20 mg/l, both values falling well within the discharge limits (FIGS. 1 and 2).

EXAMPLE 7

The consortium formulated by combining the three bacterial isolates, B4, A9 and B17, exhibited better results as compared to their individual components, with the COD level of the sample going down to 180 mg/l and the BOD levels coming down to 20 mg/l, both values falling well with the discharge limits The bacterial strains comprised in this consortium were identified as *Pseudomonas aeruginosa* (DSMZ 03504), *Bacillus megaterium* (MTCC 6544) and *Stenotrophomonas maltopbilia* which are deposited at International Depository at IMTECH, Sector 39A, Chandigarh, India.

Advantages
1 The selected formulated bacterial consortium comprising of the isolated bacterial strains, act in a synergistic way and is capable of degrading the easily assimilable as well as the refractory organic compounds present in pulp and paper wastewater.
2. This consortium is capable of effectively reducing the pollutional load of the pulp and paper wastewaters, in terms of COD and BOD within the desired discharge limits.
3. The use of such specific consortia can overcome the inefficiencies of the conventional biological treatment facilities currently operational in the pulp and paper mills.

We claim:

1. A synergistic bacterial consort for treatment of pulp and paper industrial wastewater, the consortium comprising three bacterial strains, *Pseudomonas aeruginosa* (DSMZ 03504), *Bacillus megaterium* (MTCC 6544) and *Stenotrophomonas maltophilia* (MTCC 5182).

2. A bacterial consortium as claimed in claim 1 wherein each strain is present in an amount of 20 to 40% by wt.

3. A bacterial consortium as claimed in claim 1 wherein all strains are present in equal proportions.

4. A bacterial consortium as claimed in claim 1 wherein the bacterial stains are isolated from activated sludge and soil samples collected from vicinity of pulp and paper mills.

5. A bacterial consortium as claimed in claim 1 wherein *Pseudomonas aeruginosa* (DSMZ 03504) has the following characteristics: Gram-Negative, Shape-rods.

6. A bacterial consortium as claimed in claim 1 wherein *Bacillus megaterium* (MTCC 6544) has the following characteristics: Gram-Positive, Shape-rods.

7. A bacterial consortium as claimed in claim 1 wherein *Stenotrophomonas maltophilia* (MTCC 5182) has the following characteristics: Gram-Negative, Shape-rods.

8. A bacterial consortium as claimed in claim 1 wherein the consortium exhibits 67 to 71% COD removal and 87 to 89% BOD removal.

9. A process for the formation of a bacterial consortium for the treatment of pulp and paper industrial wastewater, the consortium comprising three bacterial strains, *Pseudomonas aeruginosa* (DSNZ 03504), *Bacillus megaterium* (MTCC 6544) and *Stenotrophomonas maltophilia* (MTCC 5182), the process comprising inoculating individual bacterial isolates separately in nutrient broth, incubating the inoculates, mixing the individual cultures after colony formation, centrifuging the resultant cell suspension to form a cell pellet, washing the cell pellet and re-centrifuging to obtain a final cell pellet, and suspending the final cell pellet in phosphate buffer.

10. A process as claimed in claim 9 wherein the nutrient broth contains per liter, 5.0 g of peptic digest of animal tissue; 5.0 g of sodium chloride, 1.5 g of beef extract; 1.5 g of yeast extract and 0.1 ml of Tween 80.

11. A process as claimed in claim 9 wherein the incubation of the cell cultures is effected at a temperature in the range of 32-37° C. and for approximately 12-18 hours, under gentle shaking at a rpm in the range of 100-120.

12. A process as claimed in claim 9 wherein the colony formation is determined by measuring the optical density of all cultures 650 nm at appropriate time intervals till colony formation unit CFU/ml reaches about $10^9$ to form a cell suspension.

13. A process as claimed in claim 9 wherein the cell suspension is centrifuged at an appropriate rpm for a period in the range of 15 to 20 minutes at a temperature ranging between 4-10° C. to form a cell pellet.

14. A process as claimed in claim 9 wherein the cell pellet is washed by dissolving in minimal amount of 50 mM phosphate buffer having a pH of 6.8.

15. A process as claimed in claim 9 wherein the washed cell pellet is recentrifuged at an appropriate rpm for a period in the range of 15 to 20 minutes at a temperature ranging between 4-10° C. to form a final cell pellet.

16. A process as claimed in claim 9 wherein the final pellet is suspended in 50 mM phosphate having a pH 6.8 to form the consortium.

17. A process as claimed in claim 9 wherein the bacteria are isolated from sources in the vicinity of pulp and paper wastewater and include old activated sludge tom plant ETP and soil samples.

18. A process as claimed in claim 9 wherein each strain is present in an amount of 20 to 40% by wt.

19. A process as claimed in claim 9 wherein the all strains are present in equal proportions.

20. A process as claimed in claim 9 wherein the *Pseudomonas aeruginosa* (DSMZ 03504) has the following characteristics: Gram-Negative, Shape-rods.

21. A process as claimed in claim 9 wherein the *Bacillus megaterium* (MTCC 6544) has the following characteristics: Gram-Positive, Shape rods.

22. A process as claimed in claim 9 wherein the *Stenotrophomonas maltophilia* (MTCC 5182) has the following characteristics: Gram-Negative, Shape-rods.

23. A process as claimed in claim 9 wherein the consortium exhibits 67 to 71% COD removal and 87 to 89% BOD removal.

24. A process for the treatment of pulp and paper industrial wastewater using a bacterial consortium comprising three bacterial stains, *Pseudomonas aeruginosa* DSMZ 03504), *Bacillus megaterium* (MTCC 6544) and *Stenotrophomonas maltophilia* (MTCC 5182), the process comprising inoculating pulp and paper industrial wastewater with the bacterial consortium, incubating the bacterial consortium in the wastewater and measuring the COD and BOD demand of the wastewater.

25. A process as claimed in claim 24 wherein the consortium exhibits 67 to 71% COD removal and 87 to 89% BOD removal.

26. A process as claimed in claim 24 wherein the bacteria are isolated from sources in the vicinity of pulp and paper wastewater and include old activated sludge from plant ETP and soil samples.

27. A process as claimed in claim 24 wherein each strain is present in an amount of 20 to 40% by wt.

28. A process as claimed in claim 24 wherein the all strains are present in equal proportions.

29. A process as claimed in claim 24 wherein the *Pseudomonas aeruginosa* (DSMZ 03504) has the following characteristics: Gram-Negative, Shape-rods.

30. A process as claimed in claim 24 wherein the *Bacillus megaterium* (MTCC 6544) has the following characteristics: Gram-Positive, Shape-rods.

31. A process as claimed in claim 24 wherein the *Stenotrophomonas maltophilia* (MTCC 5182) has the following characteristics: Gram-Negative, Shape-rods.

* * * * *